United States Patent
Shalev et al.

(10) Patent No.: US 10,853,070 B1
(45) Date of Patent: Dec. 1, 2020

(54) PROCESSOR SUSPENSION BUFFER AND INSTRUCTION QUEUE

(71) Applicant: Habana Labs Ltd., Caesarea (IL)

(72) Inventors: Ron Shalev, Pardes Hana-Karkur (IL); Evgeny Spektor, Kfar Yona (IL); Ran Halutz, Ramat HaSharon (IL)

(73) Assignee: HABANA LABS LTD., Caesarea (IL)

( * ) Notice: Subject to any disclaimer, the term of this patent is extended or adjusted under 35 U.S.C. 154(b) by 65 days.

(21) Appl. No.: 16/150,299

(22) Filed: Oct. 3, 2018

Related U.S. Application Data

(60) Provisional application No. 62/575,537, filed on Oct. 23, 2017.

(51) Int. Cl.
  *G06F 9/30* (2018.01)
  *G06F 9/38* (2018.01)
  *G06F 12/06* (2006.01)
  *G06F 5/06* (2006.01)

(52) U.S. Cl.
  CPC .......... *G06F 9/3004* (2013.01); *G06F 9/3814* (2013.01); *G06F 12/0653* (2013.01); *G06F 5/06* (2013.01)

(58) Field of Classification Search
  CPC .............................. G06F 9/3004; G06F 9/3814
  See application file for complete search history.

(56) References Cited

U.S. PATENT DOCUMENTS

| | | | |
|---|---|---|---|
| 7,543,119 B2 | 6/2009 | Hessel et al. | |
| 9,262,165 B2 | 2/2016 | Hatano et al. | |
| 2013/0226986 A1* | 8/2013 | Zievers | G06F 9/545 709/202 |
| 2018/0188997 A1* | 7/2018 | Fleming, Jr. | G06F 12/00 |
| 2018/0336456 A1* | 11/2018 | Norrie | G06F 9/3887 |

\* cited by examiner

*Primary Examiner* — Zachary K Huson
(74) *Attorney, Agent, or Firm* — Kligler & Associates Patent Attorneys Ltd

(57) ABSTRACT

A processor includes a processing engine, an address queue, an address generation unit, and logic circuitry. The processing engine is configured to process instructions that access data in an external memory. The address generation unit is configured to generate respective addresses for the instructions to be processed by the processing engine, to provide the addresses to the processing engine, and to write the addresses to the address queue. The logic circuitry is configured to access the external memory on behalf of the processing engine while compensating for variations in access latency to the external memory, by reading the addresses from the address queue, and executing the instructions in the external memory in accordance with the addresses read from the address queue.

12 Claims, 4 Drawing Sheets

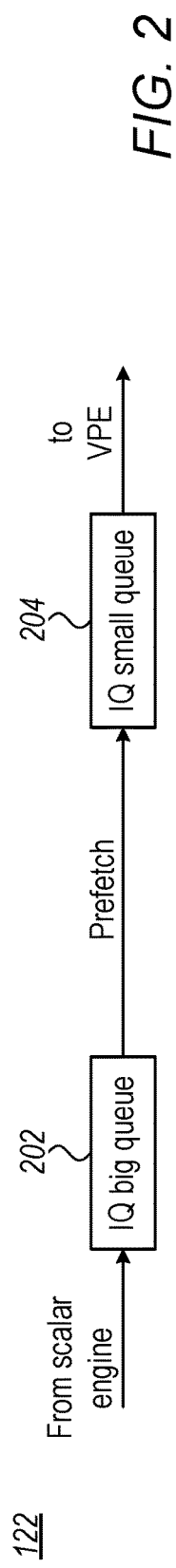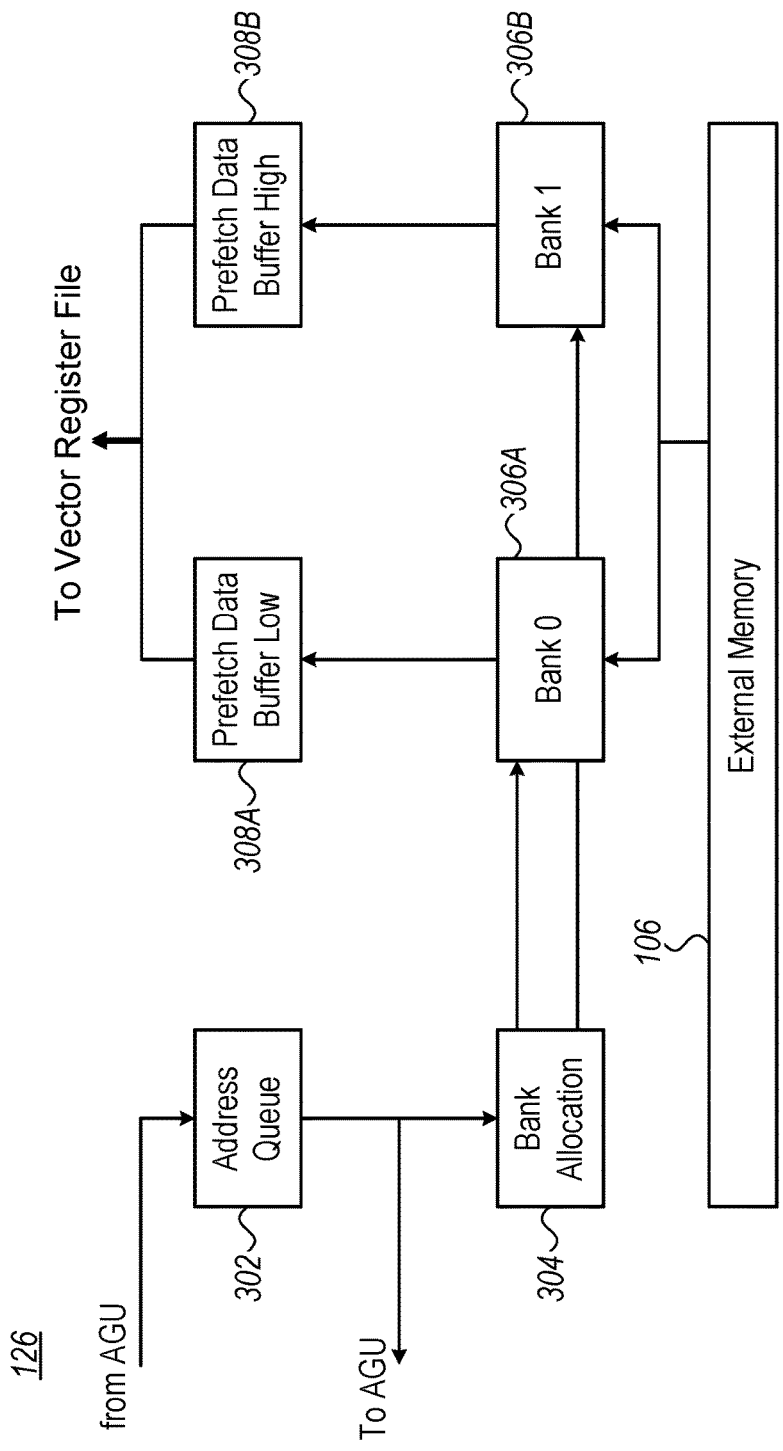

PROCESSOR SUSPENSION BUFFER AND INSTRUCTION QUEUE

CROSS-REFERENCE TO RELATED APPLICATIONS

This application claims the benefit of U.S. Provisional Patent Application 62/575,537, filed Oct. 23, 2017, whose disclosure is incorporated herein by reference.

FIELD OF THE INVENTION

The present invention relates generally to processor architectures, and particularly to techniques for efficiently utilizing a processor by hiding the variable latency of an external memory.

BACKGROUND OF THE INVENTION

Vector processing is a common operation for many applications such as deep learning. Vector Processors may read some or all input data from memory, and, likewise, may store output data in memory. Consequently, vector processing may involve accessing memory for input and/or output.

U.S. Pat. No. 7,543,119, for example, describes a vector processing system using a System-On-a-Chip (SOC) implementation technique. One or more scalar processors (or cores) operate in conjunction with a vector processor, and the processors collectively share access to a plurality of memory interfaces coupled to Dynamic Random Access read/write Memories (DRAMs).

As another example, U.S. Pat. No. 9,262,165 describes a vector processor including an instruction fetching unit configured to acquire an instruction, a decoding/issuing unit configured to decode the instruction and issuing the instruction, an operation group configured to include a plurality of operation units, and a register configured to store the element data column.

SUMMARY OF THE INVENTION

An embodiment of the present invention that is described herein provides a processor including a processing engine, an address queue, an address generation unit, and logic circuitry. The processing engine is configured to process instructions that access data in an external memory. The address generation unit is configured to generate respective addresses for the instructions to be processed by the processing engine, to provide the addresses to the processing engine, and to write the addresses to the address queue. The logic circuitry is configured to access the external memory on behalf of the processing engine while compensating for variations in access latency to the external memory, by reading the addresses from the address queue, and executing the instructions in the external memory in accordance with the addresses read from the address queue.

In an embodiment, the instructions include write instructions, the processing engine is configured to write the data to a data buffer, and the logic circuitry is configured to write the data from the data buffer to the external memory.

In some embodiments, the instructions include read instructions, and the logic circuitry is configured to read the data from the external memory into a data buffer, to be available to the processing engine. In an embodiment, the logic circuitry is configured to request the data from the external memory in a first order, to receive the data from the external memory in a second order that is different from the first order, but to provide the data to the processing engine, using the data buffer, in the first order.

In yet other embodiments, the processor includes an instruction queue, which is configured to delay the instructions to be provided to the processing engine, so as to provide the instructions to the vector processing engine in synchronization with the corresponding data.

In alternative embodiments, the processor includes two or more counters that are allocated to respective kernels processed by the processing engine, and each counter is configured to count write operations to the external memory that were requested by the logic circuitry but not yet completed, and, when one of the counters is decremented to zero, the logic circuitry is configured to indicate to the processing engine that data for the corresponding kernel is ready in the external memory.

There is additionally provided, in accordance with an embodiment of the present invention, a method including, in a processing engine, processing instructions that access data in an external memory. In an address generation unit, respective addresses are generated for the instructions to be processed by the processing engine, the addresses are provided to the processing engine, and the addresses are written to an address queue. Using logic circuitry, the external memory is accessed on behalf of the processing engine while compensating for variations in access latency to the external memory, by reading the addresses from the address queue, and executing the instructions in the external memory in accordance with the addresses read from the address queue.

The present invention will be more fully understood from the following detailed description of the embodiments thereof, taken together with the drawings in which:

BRIEF DESCRIPTION OF THE DRAWINGS

FIG. 2 is a block diagram that schematically describes the structure of an instruction queue that is located between a scalar engine and a Vector Processor Engine, in accordance with some embodiments of the present invention;

FIG. 3 is a block diagram that schematically describes the structure of a Load suspension buffer, in accordance with an embodiment of the present invention;

DETAILED DESCRIPTION OF EMBODIMENTS

Overview

Figure 1:
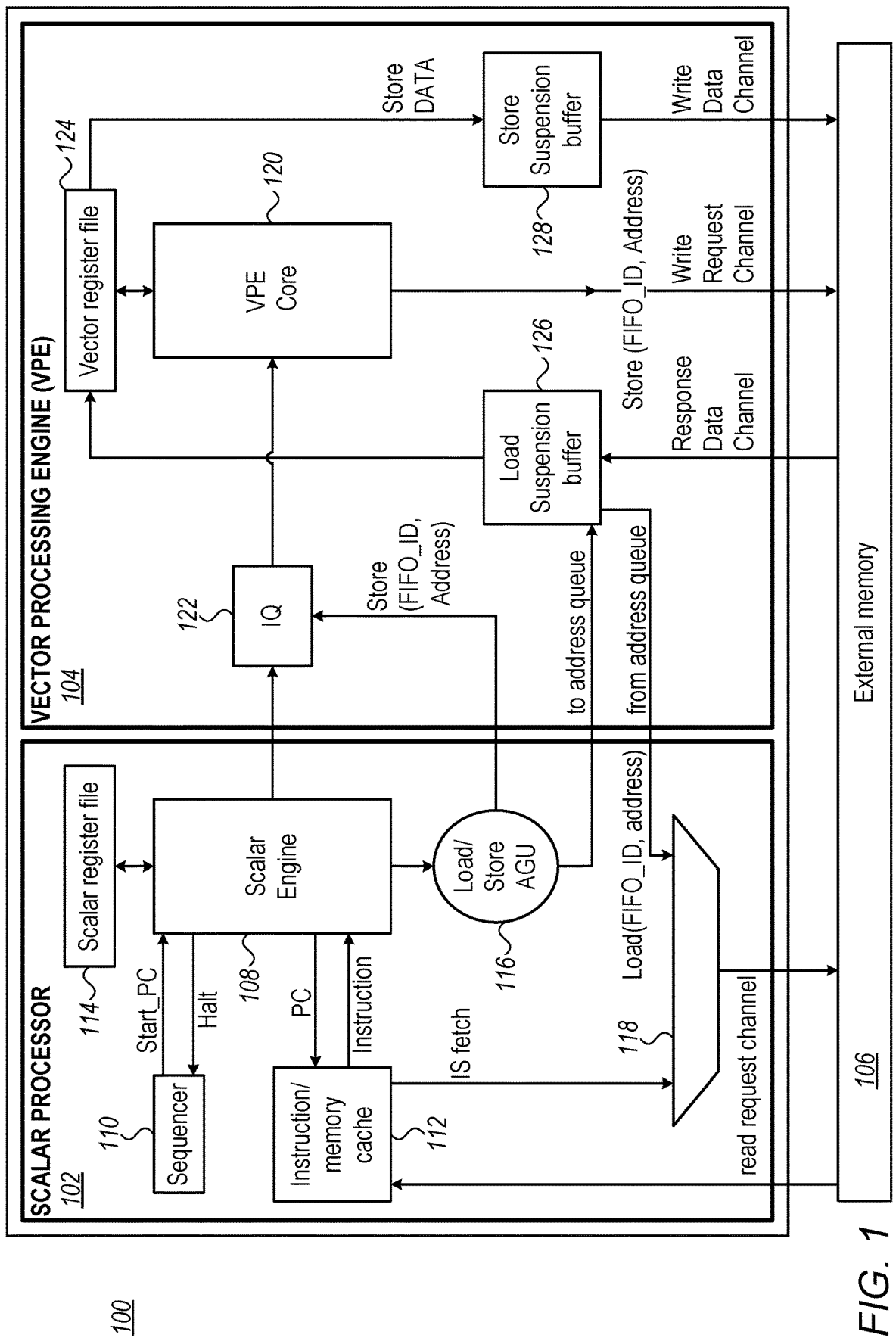
FIG. 1 is a block diagram that schematically describes the architecture of a vector processor, in accordance with an embodiment of the present invention.

Vector processing is a common operation for many applications such as deep learning. For multi-dimensional arrays, a vector processor typically performs vector processing over one dimension, which is orthogonal to other dimensions in which the processing of the vectors elements is done. Arrays of three or more dimensions will be referred to hereinbelow as Tensors.

According to embodiments of the present invention, vector processors (sometimes referred to as Array Processors) typically comprise an instruction memory, a data memory, a scalar processing engine and a vector processing engine (referred to hereinbelow as VPE).

According to some embodiments of the present invention, the scalar processing engine fetches instructions (for example Very Long Instruction Word (VLIW) instructions) from instruction memory and sends the vector processing parts of the instructions to the VPE. The VPE communicates with external memory to load vector input data and store vector output data. Because of the latency of the external memory, the processing may be stalled until input vector data has been loaded from the memory, or until output vector data has been stored to the memory, which may degrade the performance of the vector processor.

In embodiments of the present invention, the vector processor comprises flexible delay memory buffers for read (i.e. load) and write (i.e. store) operations, referred to hereinbelow as "load suspension buffer" and "store suspension buffer," respectively. The load suspension buffer is configured to prefetch from the memory data that the VPE has requested to read, whereas the store suspension buffer is configured to transfer to memory data that the VPE outputs.

According to an embodiment, the load suspension buffer has flexible delay, which is dynamically applied with respect to the temporal memory latency, and such that a continuous stream of data is input to the VPE in the order it was requested from memory.

According to embodiments of the present invention, an Address Generation Unit calculates the addresses of data that the vector processor may need and sends the addresses to an address queue in the load suspension buffer. In an embodiment, the address queue outputs the addresses, to a memory request channel of the external RAM. Thus, if memory requests are delayed by the external memory, the address queue will store the corresponding addresses, and address calculation in the Address Generation Unit need not wait for the memory to be ready.

In an embodiment of the present invention, vector processing instructions are also queued in an instruction buffer, with a maximum delay that equals to the maximum external memory output delay. Thus, the vector processor can always read (pop) the next instruction from the instruction queue, and the scalar engine can always write (push) new instructions to the instruction queue regardless of the actual memory latency.

According to embodiments of the present invention, the memory sends data in response to requests from the vector processor in an order that is different from the order of the corresponding requests. According to an embodiment, a buffer (e.g. the suspension buffer) may reorder the data that is sent to the vector engine.

In some embodiments, the vector processor processes vectors which are wider than the width of words in memory accesses, i.e. a vector processor word comprises a plurality of memory words. In an embodiment, the suspension buffer comprises a plurality of banks, wherein the total width of the banks is equal to (or larger than) the vector processor word. The suspension buffer stores consecutive memory words in separate banks and sends to the vector processing core words that comprise data read concurrently from a plurality of banks.

Some embodiments of the present invention support multiple kernels, which are executed serially by the vector processor. Each kernel processes data, and when kernel processing completes, the vector processor signals to a main computer that data is ready in the external memory. In an embodiment, the last instruction of all kernels may be a halt instruction, with parameters that comprise an indication to the location of the output data. According to embodiments of the present invention, the Store Suspension buffer comprises a plurality of counters that are allocated to kernels, wherein a new counter is allocated when a kernel starts, and deallocated (i.e. is ready to be allocated to a new kernel) when all write operations pertaining to the current kernel complete. In some embodiments, each counter increments when the store suspension buffer requests from the memory a store operation, pertaining to the kernel to which the counter is allocated, and decrements when the store suspension buffer receives an indication from the memory that a write request pertaining to the corresponding kernel is completed. According to an embodiment, when decrement operation empties a counter, the store suspension buffer generates a message that indicates that data for the current kernel is ready in the external memory.

System Description

Vector processing entails accessing of external memory for inputs and outputs; external memory accesses typically have varying latency, which may degrade the performance of the vector processor. Embodiments of the present invention hide the variable latency of the memory from the processor, to achieve high utilization of the vector processing engine.

FIG. 1 is a block diagram that schematically describes the architecture of a Vector Processor 100 in accordance with embodiments of the present invention. Vector Processor 100 comprises a Scalar Processor 102, a Vector Processing Engine (VPE) 104, and an External Memory 106.

Scalar Processor 102 comprises a Scalar Engine 108, which is configured to decode and execute instructions; a Sequencer 110, which is configured to govern the operation of Scalar Engine 108 (using start-PC, Halt and other control signals); An Instruction Cache 112, which is configured to prefetch instructions; a Load-Store Address Generation Unit (AGU) 116, which is configured to generate the addresses and the tags of vector-processor data; and, a Multiplexer 118, which is configured to initiate memory access requests, through a read-request channel, in response to requests from Instruction Cache 112 and from AGU 116. According to the example embodiment of FIG. 1, addresses that AGU 116 generates enter an address queue in VPE 104 (will be described below); multiplexer 118 is coupled to receive the addresses from the address queue, after a delay.

VPE 104 comprises a VPE Core 120, which is configured to execute vector instructions; an Instruction Queue 122, which is configured to queue instructions from Scalar Processor 102 till the VPE Core is ready to execute the instructions; a Vector Register File 124, which is used by the VPE core as a temporary storage; a Load Suspension Buffer 126; and, a Store Suspension Buffer 128.

According to the example embodiment of FIG. 1, Load Suspension Buffer 126 comprises flexible latency and rearrangement of out-of-order data. AGU 116 sends Load requests, through Multiplexer 118, to external memory 106. The External Memory sends the requested data on the Response Channel to Load Suspension Buffer 126, which then sends the data to Vector-Register-File 124. VPE Core 120 reads the data from Vector-Register-File 124. According to embodiments, Load Suspension Buffer 126 comprises flexible latency, and the data path comprising Load-Suspension-Buffer 126 and Vector-Register-File 124 enable VPE core 120 to access read data with zero latency.

According to embodiments of the present invention, Data Write operations that VPE Core 120 initiates are routed through Vector-Register-File 124 and to Store Suspension Buffer 128. According to embodiments, VPE core 120 writes data with zero latency (that is—whenever VPE Core 120 needs to store data in memory, the VPE Core writes the data to Vector-Register-File 124 with no delay); Store Suspension Buffer 128 has flexible latency, and delays writing into memory 106 until the memory is ready. Thus, according to embodiments of the present invention, the variable latency associated with writing into external memory 106 is hidden from VPE Core 120.

Embodiments of the present invention typically comprise memory write circuits for scalar engine 108. Such circuits are omitted from FIG. 1, for clarity.

The configuration of vector processor 100 is an example configuration that is depicted purely for the sake of conceptual clarity. Other suitable configurations may be used in alternative embodiments of the present invention. For example, scalar engine 108 may be omitted or replaced by a state-machine; scalar register file 114 may be omitted, there may be more memory request channels, and hence multiplexer 118 may be omitted; memory 106 may comprise two or more separately accessible memories (e.g. one for instructions and one for data); Store suspension buffer 128 may be omitted or integrated in external memory 106; addresses that AGU 116 generates may be delayed within the AGU, rather than in vector processor 104.

In some embodiments, scalar engine 108 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

FIG. 2 is a block diagram that schematically describes the structure of Instruction Queue 122 of FIG. 1. The Instruction queue is configured to store the instructions until vector data sent from the external memory and corresponding to the instruction is ready to be used by VPE Core 120.

According to the example embodiment of FIG. 2, the instruction queue comprises a Big Queue 202 (typically implemented as SRAM), followed by a Small Queue 204 (typically implemented by flip-flops). After the scalar engine pushes an instruction into Big Queue 202, the instruction is prefetched and pushed into the small queue. VPE Core 120 fetches the instruction from the small queue. In an embodiment, Big Queue 202 may be slower than Small Queue 204, whereas Small Queue 204 may consume less silicon area per unit storage than Big Queue 202; the combination of a Small Queue and a Big Queue allows fast access time by the VPE Core, and large enough buffer (at a given silicon area) to absorb the variable latency from the memory, and to provide the VPE Core accesses to the instruction queue with minimal or no latency time.

FIG. 3 is a block diagram that schematically describes the structure of Load Suspension Buffer 126 of FIG. 1. The Load Suspension Buffer comprises an address queue 302, configured to temporarily store addresses of memory read requests; a Bank Allocator 304, which is configured to allocate one of two banks to temporarily store data from external memory 106 (FIG. 1); Banks 0 and 1 (306A and 306B, respectively), which are configures to store data read from the external RAM; and, Prefetch Data Buffers Low and High (308A and 308B, respectively). In the example embodiment of FIG. 3, the width of the vector processor word is twice the size of the data word read from the external RAM. Therefore, to read a vector processor word, the suspension buffer reads two consecutive words from the external RAM and stores them in Bank-0 and Bank-1. In alternative embodiments the ratio between the word width of the external memory and the width of the vector processor word may be any other number, and, correspondingly, the number of banks in such embodiments will be any number, including 1.

In an embodiment Banks 306A and 306B may be slower than Prefetch Data Buffers 308A and 308B; whereas the Prefetch Data Buffers may consume less silicon area per unit storage than the banks. The combination of Small Prefetch Data Buffers and Big Banks allows fast access time by the VPE Core, and large enough buffer (at a given silicon area) to absorb the variable latency from the memory, and to provide the VPE Core accesses to the loaded data with minimal or no latency time.

In embodiments of the present invention, when scalar processor 102 (FIG. 1) requests data-read from the external memory, the external memory may not be ready, and the scalar processor may have to wait until the memory is ready to accept the request (this delay of the memory adds up to the latency of the memory—the scalar processor first have to wait until the memory is ready to accept a request, and then until the memory fulfills the request and return the requested data). In the example embodiment of FIG. 3, AGU 116 (FIG. 1) is coupled to the input of Address Queue 302, and the output of Address Queue 302 is coupled to multiplexer 118 (FIG. 1). The address queue delays the addresses generated by AGU 116 until the external memory is ready to accept requests. Thus, scalar processor 102 does not have to wait in case the memory is not ready to accept a request.

The configuration of load suspension buffer 126 that is described in FIG. 3 is an example configuration that is depicted purely for the sake of conceptual clarity. Other suitable configurations may be used in alternative embodiments.

Figure 4:
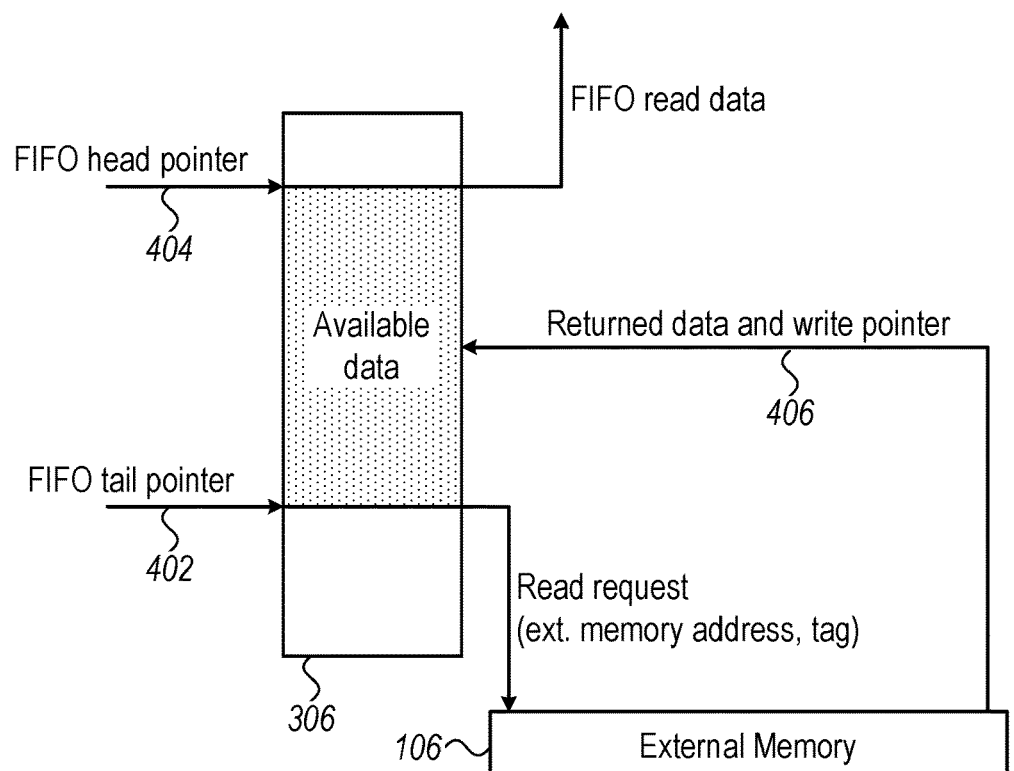
FIG. 4 is a block diagram that schematically describes a process for ordering out-of-order returned data in a Load suspension buffer, in accordance with an embodiment of the present invention.

FIG. 4 is an illustration that schematically describes Out-of-Order (OoO) handling by the load suspension buffer, according to embodiments of the present invention. Read requests from the memory may return the requested data OoO with respect to the order of the read requests. However, the vector engine expects the data to return in order with respect to the read request.

According to the example embodiment of FIG. 4, one or more of the memory banks that are used to store data which the suspension buffer receives from the external memory (for example, banks 306A and 306B depicted in FIG. 3), is implemented as a FIFO 306. A read request from the scalar engine allocates an entry at a tail pointer 402 of the FIFO and provides the tail location (or a representation thereof) as a tag to the read request. The suspension buffer will store data that it receives from the external memory at a location 406, corresponding to the tag that the memory returns with the data, in the FIFO. The vector engine always reads data from a head pointer 404. Thus, data which the external memory returns OoO will be read by the vector processor in the order in which the request have been issued.

The mechanism to handle OoO data that is depicted in FIG. 4 is an example that is given purely for the sake of conceptual clarity. In alternative embodiments of the present invention other suitable mechanisms may be used. For example, in some embodiments memory 306 is implemented as a RAM with dedicated write-address and read-address generation units.

Figure 5:
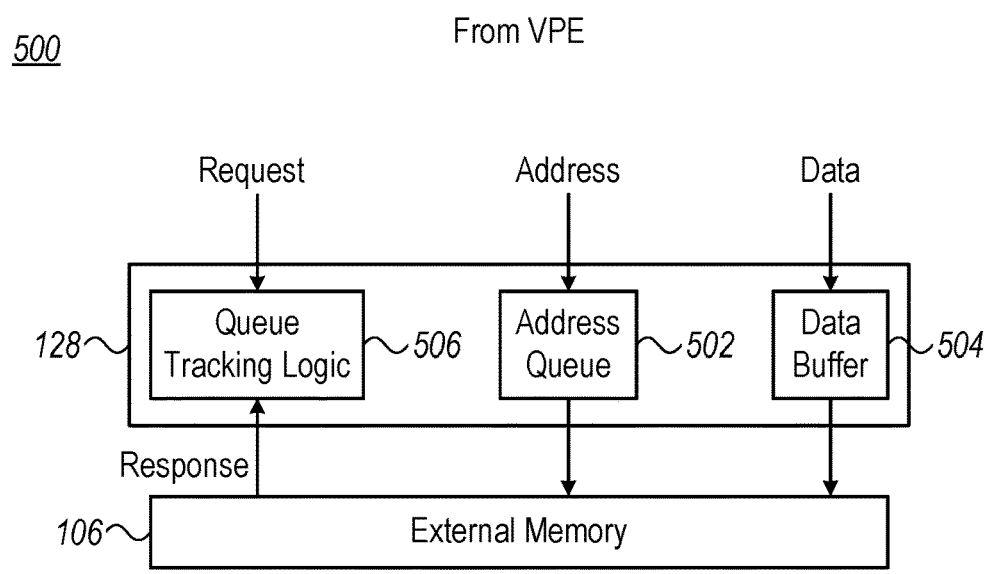
FIG. 5 is a block diagram that schematically describes the Store suspension buffer structure, in accordance with some embodiments of the present invention.

FIG. 5 is a block diagram 500 of Store Suspension Buffer 128 (FIG. 1) according to an embodiment of the present invention. An Address Queue 502 stores the addresses of the memory write requests, and a Data Buffer 504 stores the data. In embodiments of the present invention the vector processor sends both the addresses (which the vector processor gets from the scalar processor) and the data. When the external memory is not ready to accept a write request, the request's address and data wait in the address and data buffers, respectively. Thus, the vector processor does not stall if the external memory is not ready to accept a write request.

In some embodiments of the present invention, store suspension buffer 128 comprises a Queue Tracking Logic unit 506 (will be referred to herein as QTL). The QTL keeps track of the address and data queues and may be used to precisely indicate when a vector processing kernel completes, as will be described hereinbelow.

Some embodiments of the present invention support multiple kernels, which are executed serially by the vector processor. Each kernel processes data, and ends when the kernel processing is complete, and the store suspension buffer has stored all the entries pertaining to the current kernel in memory. At that time the vector processor may signal that data is ready in the external memory. Memory store operations may complete OoO, and, hence, some embodiments of the present invention comprise means to track the status of the store operations of each kernel and indicate when the kernel ends.

In an embodiment of the present invention, the last instruction of all kernels may be, for example, HALT (MessageAddress,MessagePayload), which indicates the location of the output data (MessagePayload) and the address of the message (MessageAddress). According to embodiments of the present invention, QTL 506 comprises a plurality of counters, wherein a new counter is allocated when a kernel starts, and deallocated (i.e. is ready to be reallocated to a new kernel) when all write operations pertaining to the current kernel complete. Thus, according to embodiments of the present invention, kernels may be executed with small or no time gaps ("back to back")

Figure 6:
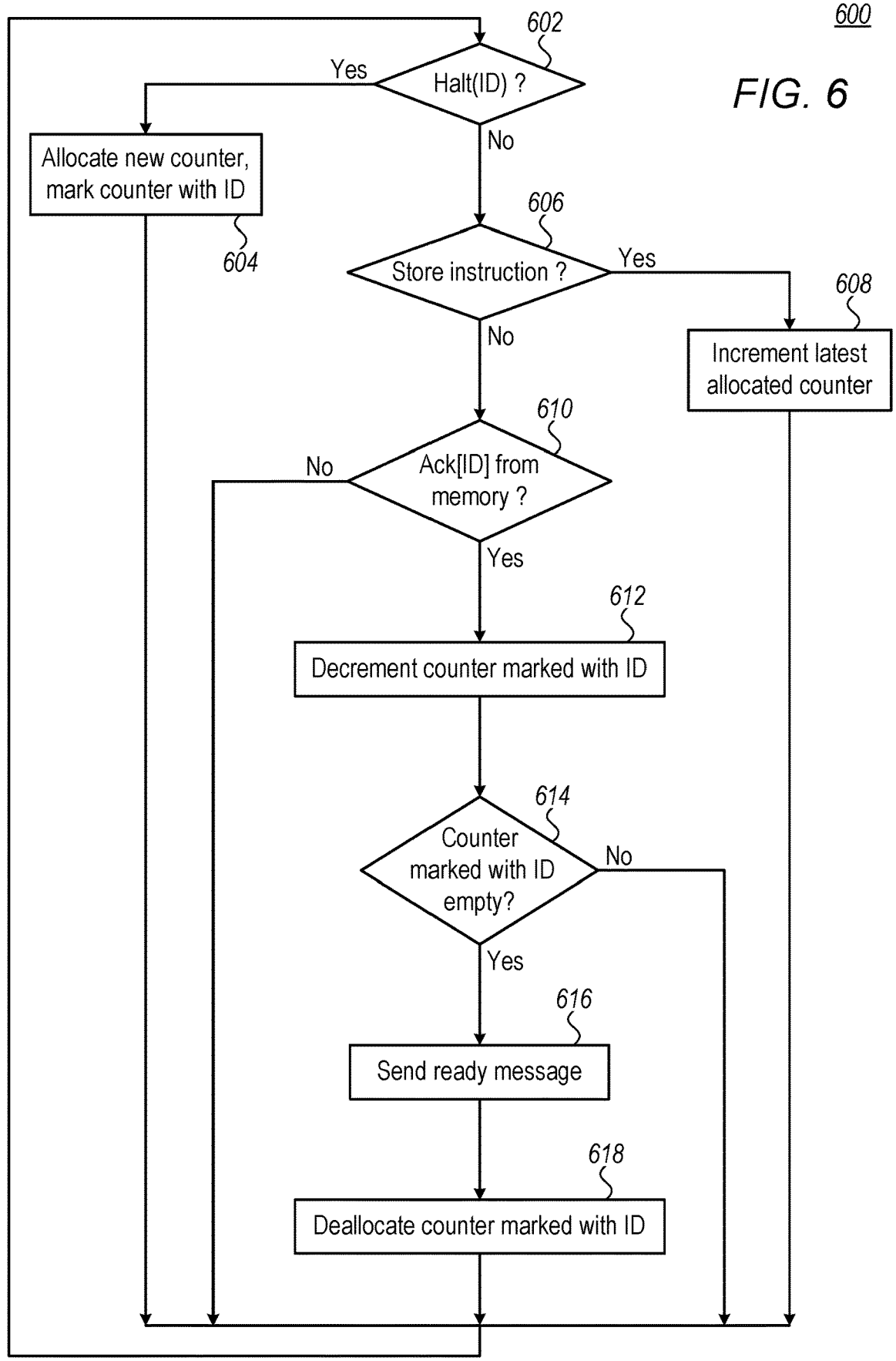
FIG. 6 is a flow chart that schematically describes a method for indicating when a vector processing kernel completes, in accordance with an embodiment of the present invention.

FIG. 6 is a flow chart 600 that schematically describes a mechanism to precisely indicate when a vector processing kernel completes. The flow chart is executed by QTL 506. The flow starts in a Checking-For-Halt step 602, wherein the QTL checks if the current instruction is a HALT instruction. If the current instruction is HALT, the QTL enters an Allocating-New-Counter step 604, wherein the QTL allocates a counter to track the bank for write operations that correspond to the next kernel. The QTL marks the new counter with an ID, which corresponds to the next kernel.

If, at step 602, the QTL does not receive a HALT instruction, the QTL enters a Checking-for-Store-Instruction step 606, and checks if it gets a new store instruction. If, in step 606, the QTL gets a new store instruction, it will enter an Increment-Counter step 608, wherein the QTL increments the most recently allocated counter.

If, at step 606, the QTL does not get a new store instruction, the QTL enters a Checking-for-Ack step 610, wherein the QTL checks if the memory sends an acknowledge for a store request that the store-suspension-buffer has sent. The memory sends the acknowledge with an ID, which is identical to the ID that the QTL sent to the memory with the request. If, in step 610, the memory sends an acknowledge, the QTL will enter a Decrementing-Counter step 612, wherein the QTL decrements the counter with the corresponding ID. Thus, at all times, each of the counters will store a number that corresponds to the number of pending store operations for the corresponding kernel.

After step 612, the QTL enters a Checking-Counter-Empty step 614, wherein the QTL checks if the counter is empty flowing the decrement of step 612. If, at step 612, the counter is empty, the corresponding kernel is empty. The QTL will enter a Sending-Ready-Message step 616, wherein the QTL sends a message indicating a kernel-complete event (typically with a pointer to the output data), and then enter a Deallocating-Counter step 618, where the current counter is deallocated.

After executing each of steps 604, 608, 610 (when there is no acknowledge from memory), 614 (when the counter is not empty) and 618, the QTL returns to the starting point of the flow chart, i.e. step 602, and checks for further HALT instructions.

As would be appreciated, Flow Chart 600 is an example flow chart that is depicted purely for the sake of conceptual clarity. In alternative embodiments other suitable flow-charts may be used. For example, checking steps 602, 606 and 610 may be done concurrently.

The configurations of Vector Processor 100, Instruction Queue 122, Load Suspension Buffer 126 and Store Suspension Buffer 128, shown in FIGS. 1, 2, 3 and 5 are example configurations that are shown purely for the sake of conceptual clarity. Any other suitable configurations can be used in alternative embodiments. The different elements of Vector Processor 100 may be implemented using suitable hardware, such as in one or more Application-Specific Integrated Circuits (ASICs) or Field-Programmable Gate Arrays (FPGAs), using software, using hardware, or using a combination of hardware and software elements.

Although the embodiments described herein mainly address vector processors, the methods and systems described herein can also be used in other applications, such as in any computer system that requires data loading from memory and processes the loaded data.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
   a vector processing engine; and
   a scalar processor, which is configured to:
      fetch, from a memory, Very Long Instruction Word (VLIW) instructions that comprise both scalar-instruction slots and vector-instruction slots;
      extract scalar instructions from the scalar-instruction slots of the VLIW instructions, and execute the scalar instructions;

extract, from the vector-instruction slots of the VLIW instructions, vector instructions comprising read and write instructions that access data in the memory;
pre-process the vector instructions, including:
    generating addresses for use by the vector processing engine in accessing the data;
    storing the generated addresses in an address queue; and
    accessing the memory on behalf of the vector processing engine while compensating for variations in access latency to the memory, by reading the addresses from the address queue and executing the vector instructions in the memory in accordance with the addresses read from the address queue; and
transfer the pre-processed vector instructions to the vector processing engine for execution.

2. The processor according to claim 1, wherein the vector instructions comprise write instructions for writing data to the memory, wherein the vector processing engine is configured to write the data to a data buffer, and wherein the scalar processor is configured to write the data from the data buffer to the memory.

3. The processor according to claim 1, wherein the vector instructions comprise read instructions for reading data from the memory, and wherein the scalar processor is configured to read the data from the memory into a data buffer, to be available to the vector processing engine.

4. A processor, comprising:
a vector processing engine; and
a scalar processor, which is configured to:
    fetch, from a memory, Very Long Instruction Word (VLIW) instructions that comprise both scalar-instruction slots and vector-instruction slots;
    extract scalar instructions from the scalar-instruction slots of the VLIW instructions, and execute the scalar instructions; and
    extract, from the vector-instruction slots of the VLIW instructions, vector instructions comprising read instructions for reading data from the memory;
    pre-process the vector instructions, including:
        requesting the data from the memory in a first order;
        receiving the data from the memory into a data buffer in a second order that is different from the first order, but providing the data to the vector processing engine, using the data buffer, in the first order; and
    transfer the pre-processed vector instructions to the vector processing engine for execution.

5. The processor according to claim 1, wherein the scalar processor is configured to store data, which is associated with the vector instructions, in an instruction queue, so as to provide the vector instructions to the vector processing engine in synchronization with the data.

6. A processor, comprising:
a vector processing engine; and
a scalar processor, which is configured to:
    fetch, from a memory, Very Long Instruction Word (VLIW) instructions that comprise both scalar-instruction slots and vector-instruction slots;
    extract scalar instructions from the scalar-instruction slots of the VLIW instructions, and execute the scalar instructions;
    extract vector instructions from the vector-instruction slots of the VLIW instructions, pre-process the vector instructions, and transfer the pre-processed vector instructions to the vector processing engine for execution; and two or more counters that are allocated to respective kernels processed by the vector processing engine, wherein each counter is configured to count write operations to the memory that were requested by the scalar processor but not yet completed, and wherein, when one of the counters is decremented to zero, the scalar processor is configured to indicate to the vector processing engine that data for the corresponding kernel is ready in the memory.

7. A method in a processor that comprises a scalar processor and a vector processing engine, the method comprising:
using the scalar processor:
    fetching from a memory Very Long Instruction Word (VLIW) instructions that comprise both scalar-instruction slots and vector-instruction slots;
    extracting scalar instructions from the scalar-instruction slots of the VLIW instructions, and executing the scalar instructions;
    extracting, from the vector-instruction slots of the VLIW instructions, vector instructions comprising read and write instructions that access data in the memory;
    pre-processing the vector instructions, including:
        generating addresses for use by the vector processing engine in accessing the data;
        storing the generated addresses in an address queue; and
        accessing the memory on behalf of the vector processing engine while compensating for variations in access latency to the memory, by reading the addresses from the address queue and executing the vector instructions in the memory in accordance with the addresses read from the address queue; and
    transferring the pre-processed vector instructions to the vector processing engine; and executing the pre-processed vector instructions using the vector processing engine.

8. The method according to claim 7, wherein extracting the vector instructions comprises extracting write instructions for writing data to the memory, and comprising writing the data by the vector processing engine to a data buffer, and writing the data from the data buffer to the memory by the scalar processor.

9. The method according to claim 7, wherein extracting the vector instructions comprises extracting read instructions for reading data from the memory, and wherein pre-processing the vector instructions comprises reading the data from the memory into a data buffer, to be available to the vector processing engine.

10. A method in a processor that comprises a scalar processor and a vector processing engine, the method comprising:
using the scalar processor:
    fetching from a memory Very Long Instruction Word (VLIW) instructions that comprise both scalar-instruction slots and vector-instruction slots;
    extracting scalar instructions from the scalar-instruction slots of the VLIW instructions, and executing the scalar instructions; and
    extracting, from the vector-instruction slots of the VLIW instructions, vector instructions comprising read instructions for reading data from the memory;
    pre-processing the vector instructions,
    including:
        requesting the data from the memory in a first order;

receiving the data from the memory into a data buffer in a second order that is different from the first order, but providing the data to the vector processing engine, using the data buffer, in the first order; and transferring the pre-processed vector instructions to the vector processing engine; and executing the pre-processed vector instructions using the vector processing engine.

11. The method according to claim 7, wherein pre-processing the vector instructions comprises storing data, which is associated with the vector instructions, in an instruction queue, so as to provide the vector instructions to the vector processing engine in synchronization with the data.

12. A method in a processor that comprises a scalar processor and a vector processing engine, the method comprising:

using the scalar processor:

fetching from a memory Very Long Instruction Word (VLIW) instructions that comprise both scalar-instruction slots and vector-instruction slots;

extracting scalar instructions from the scalar-instruction slots of the VLIW instructions, and executing the scalar instructions; and extracting vector instructions from the vector-instruction slots of the VLIW instructions, pre-processing the vector instructions and transferring the pre-processed vector instructions to the vector processing engine;

executing the pre-processed vector instructions using the vector processing engine; and allocating two or more counters to respective kernels processed by the vector processing engine, counting in each counter write operations to the memory that were requested by the scalar processor but not yet completed, and, when one of the counters is decremented to zero, indicating by the scalar processor to the vector processing engine that data for the corresponding kernel is ready in the memory.

* * * * *